United States Patent
Iketaki et al.

(10) Patent No.: US 7,870,460 B2
(45) Date of Patent: Jan. 11, 2011

(54) MAGNETIC DISK DRIVE CAPABLE OF REFRESHING DATA WRITTEN TO DISK AND DATA REFRESH METHOD

(75) Inventors: Taro Iketaki, Tachikawa (JP); Akio Mizuno, Ome (JP); Yasuhiko Ichikawa, Fussa (JP); Takao Aoki, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/608,975

(22) Filed: Oct. 29, 2009

(65) Prior Publication Data
US 2010/0165502 A1    Jul. 1, 2010

(30) Foreign Application Priority Data
Dec. 26, 2008   (JP) .............................. 2008-334882

(51) Int. Cl.
*H03M 13/00*    (2006.01)
(52) U.S. Cl. ....................................... 714/754; 714/770
(58) Field of Classification Search ................. 714/754, 714/770
See application file for complete search history.

(56) References Cited

U.S. PATENT DOCUMENTS

| | | | | |
|---|---|---|---|---|
| 5,210,866 | A * | 5/1993 | Milligan et al. ................. | 714/6 |
| 5,452,429 | A * | 9/1995 | Fuoco et al. .................... | 714/6 |
| 6,442,726 | B1 * | 8/2002 | Knefel ......................... | 714/763 |
| 6,697,976 | B1 * | 2/2004 | Satoh et al. ................... | 714/704 |
| 6,715,116 | B2 * | 3/2004 | Lester et al. ................. | 714/718 |
| 6,938,180 | B1 * | 8/2005 | Dysert et al. .................... | 714/6 |
| 7,051,232 | B2 * | 5/2006 | Wu et al. ........................ | 714/8 |
| 2001/0030895 | A1 * | 10/2001 | Li .............................. | 365/200 |
| 2004/0078640 | A1 * | 4/2004 | Wu et al. ........................ | 714/6 |
| 2006/0029230 | A1 * | 2/2006 | Kihara et al. ................ | 380/269 |
| 2006/0095381 | A1 * | 5/2006 | Yokota et al. ................. | 705/57 |
| 2007/0128899 | A1 * | 6/2007 | Mayer ......................... | 439/152 |
| 2009/0252477 | A1 * | 10/2009 | Yokota et al. ................. | 386/94 |

FOREIGN PATENT DOCUMENTS

| | | |
|---|---|---|
| JP | 04-137032 A | 5/1992 |
| JP | 10-092116 A | 4/1998 |
| JP | 2001-110004 | 4/2001 |

(Continued)

OTHER PUBLICATIONS

Japanese Office Action dated Jan. 7, 2010, Japanese Patent Application No. JP-2008-334882.

*Primary Examiner*—M. Mujtaba K Chaudry
(74) *Attorney, Agent, or Firm*—Patterson & Sheridan, LLP

(57) ABSTRACT

According to one embodiment, the controller controls a data refresh operation. The data refresh operation comprises a refresh-data read operation of reading L blocks of data by a head from a track to be refreshed on a disk, a data backup-write operation of writing the read data by the head to a backup-track on the disk, and a refresh-write operation of writing the read data by the head to the track to be refreshed after the backup-write operation. The controller sets the number L of blocks to a value that satisfies conditions for completing the backup-write operation and the refresh-write operation within a time corresponding to N revolutions of the disk from completion of the refresh-data read operation.

6 Claims, 9 Drawing Sheets

FOREIGN PATENT DOCUMENTS

| | | |
|---|---|---|
| JP | 2001-118343 | 4/2001 |
| JP | 2002-100126 | 4/2002 |
| JP | 2004-273060 A | 9/2004 |
| JP | 2005-267702 | 9/2005 |
| JP | 2008-140459 | 6/2008 |

* cited by examiner

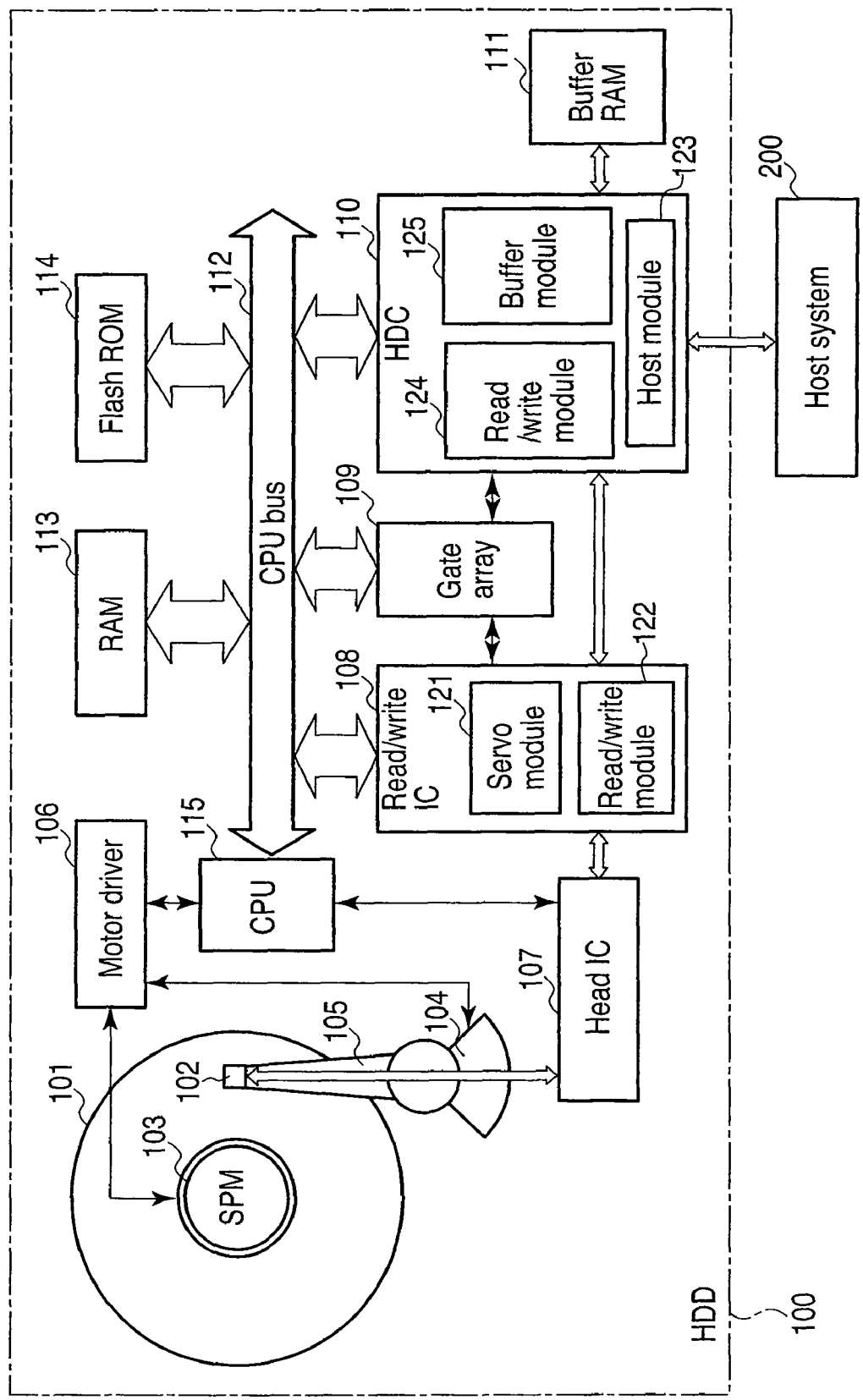
F I G. 1

| Cyl. Group \ Head | 0 | 1 | ... | m-1 |
|---|---|---|---|---|
| 0 | W(0, 0) | W(1, 0) | ... | W(m-1, 0) |
| 1 | W(0, 1) | W(1, 1) | ... | W(m-1, 1) |
| 2 | W(0, 2) | W(1, 2) | ... | W(m-1, 2) |
| ⋮ | ⋮ | ⋮ | ⋱ | ⋮ |
| p-1 | W(0, p-1) | W(1, p-1) | ... | W(m-1, p-1) |

F I G. 5

| Zone \ Head | 0 | 1 | ... | m-1 |
|---|---|---|---|---|
| 0 | B(0, 0) | B(1, 0) | ... | B(m-1, 0) |
| 1 | B(0, 1) | B(1, 1) | ... | B(m-1, 1) |
| 2 | B(0, 2) | B(1, 2) | ... | B(m-1, 2) |
| ⋮ | ⋮ | ⋮ | ⋱ | ⋮ |
| n-1 | B(0, n-1) | B(1, n-1) | ... | B(m-1, n-1) |

F I G. 6

MAGNETIC DISK DRIVE CAPABLE OF REFRESHING DATA WRITTEN TO DISK AND DATA REFRESH METHOD

CROSS-REFERENCE TO RELATED APPLICATIONS

This application is based upon and claims the benefit of priority from Japanese Patent Application No. 2008-334882, filed Dec. 26, 2008, the entire contents of which are incorporated herein by reference.

BACKGROUND

1. Field

One embodiment of the invention relates to, for example, a magnetic disk drive that refreshes data written to a disk, and also relates to a data refresh method applied to a magnetic disk drive.

2. Description of the Related Art

In recent years, the storage capacity of magnetic disk drives has increased. To increase the storage capacity, the recording density and track density of the magnetic disk have been raised. The higher the track density, the shorter the intervals of tracks (i.e., track pitch) on the disk will be. Each track has the same width as the head (more precisely, the write element included in the head). However, the width of distribution of write magnetic fields generated by the head during the data write is not always equal to the width of the head. The write magnetic fields are applied (leak to) to the periphery of the head. This phenomenon is called "write fringing."

If the track pitch is decreased, the data (recorded data) in any track may be degraded when data is written to an adjacent track. This results from the write fringing and an error in positioning the head on the track (positioning error). If the recoded data (i.e., recorded signals) is degraded many times, it will become virtually unreadable. Even if error correction codes (ECC) are used in the most effective way possible, it is difficult to restore the data.

Therefore, in any recently developed magnetic disk drive, data refresh (rewriting) must be executed to restore the recorded data before the recorded data becomes unreadable through degradation. The data refresh is known as a process in which the degraded data is first read from a storage area of the track and then written back to the storage area, thus restoring the data in its normal state.

For example, Jpn. Pat. Appln. KOKAI Publication No. 2004-273060 (the "prior art") discloses the technique of refreshing the data written to a track adjacent to a track to which data has been written a specified number of times. In the prior art, the data recorded in a track adjacent (i.e., adjacent track) to a track to which data has been written the specified number of times is determined to be degraded. Then, the data recorded in the adjacent track is read from the adjacent track and temporarily stored in RAM, as data to be refreshed. The data so stored in RAM is written back to the storage area of the adjacent track. In other words, the data to be refreshed is read from the track and then written again to the track. This data rewriting, or data refresh operation, restores the data so that it is no longer degraded.

However, in the prior art, if the supply of power to the magnetic disk drive is interrupted during the data refresh operation, the data to be refreshed may be lost. To be more specific, the data may be lost if the supply of power is interrupted during the refresh-write operation, or while the data read from the track to be refreshed (hereinafter, referred to as "refresh-track") is being written back to the refresh-track. The reason for this will be explained below.

Assume that the supply of power is interrupted during the refresh-write operation. Then, the data is incompletely written to the refresh-track. Consequently, the data in the refresh-track is effectively destroyed. At this point, the data that was read from the refresh-track is no longer in RAM. Even if the supply of power is restored, the data previously temporarily stored in RAM cannot be written to the refresh-track.

To prevent such a problem, a particular track on the disk may be used in place of RAM. That is, a particular track on the disk may be used as a backup-track in which the data in the refresh-track is temporarily saved (or backed up).

If a specified track on the disk is used as a backup-track, such data refresh as will be described will be executed in most cases. First, a backup-write operation is executed to write the data read from the refresh-track (hereinafter referred to as "original data") to the backup-track provided on the disk. In the backup-write operation, the refresh-management information that represents the state of the backup-write operation is also written to the refresh-track.

When the backup-write operation is completed, a refresh-write operation is executed, reading the data written (or saved) to the backup-track and writing it back to the area of the refresh-track in which the data was initially recorded. When the refresh-write operation is completed, the refresh-management information written to the backup-track is rewritten to refresh-management information that comprises a completion flag. Thus, the completion flag is written to the backup-track. The completion flag indicates that the data (i.e., original data) has been refreshed. If the supply of power is interrupted during the refresh-write operation and the refresh-write operation is not completed, no completion flag will be written to the backup-track.

If the specified track (i.e., backup-track) provided on the disk is used in place of the above-mentioned RAM, the original data will not be lost even if the supply of power is interrupted during the refresh-write operation. This is because the original data is saved in the backup-track. Using the original data saved in the backup-track, the refresh-write operation not yet completed can be resumed. Whether the refresh-write operation has been completed or not can be determined in accordance with whether a completion flag has been written to the backup-track.

If the specified track (i.e., backup-track) provided on the disk is used in place of the above-mentioned RAM, however, a so-called "rotational delay" will be required. As will be described later in detail, the rotational delay occurs before the backup-write operation is started and before the refresh-write operation is started, and lasts until the head comes to the write-start position of the track. Once the rotational delay has occurred, the efficiency of the data refresh operation decreases.

BRIEF DESCRIPTION OF THE SEVERAL VIEWS OF THE DRAWINGS

A general architecture that implements various features of the invention will now be described with reference to the drawings. The drawings and their associated descriptions are provided to illustrate the embodiments of the invention and not to limit the scope of the invention.

FIG. 1 is a block diagram showing an exemplary configuration of a magnetic disk drive (HDD) according to an embodiment of the invention;

FIG. 5 is a diagram showing an example of a data structure of a write count table used in the embodiment;

FIG. 6 is a diagram showing an example of a data structure of a block-number table used in the embodiment;

DETAILED DESCRIPTION

Figure 2:
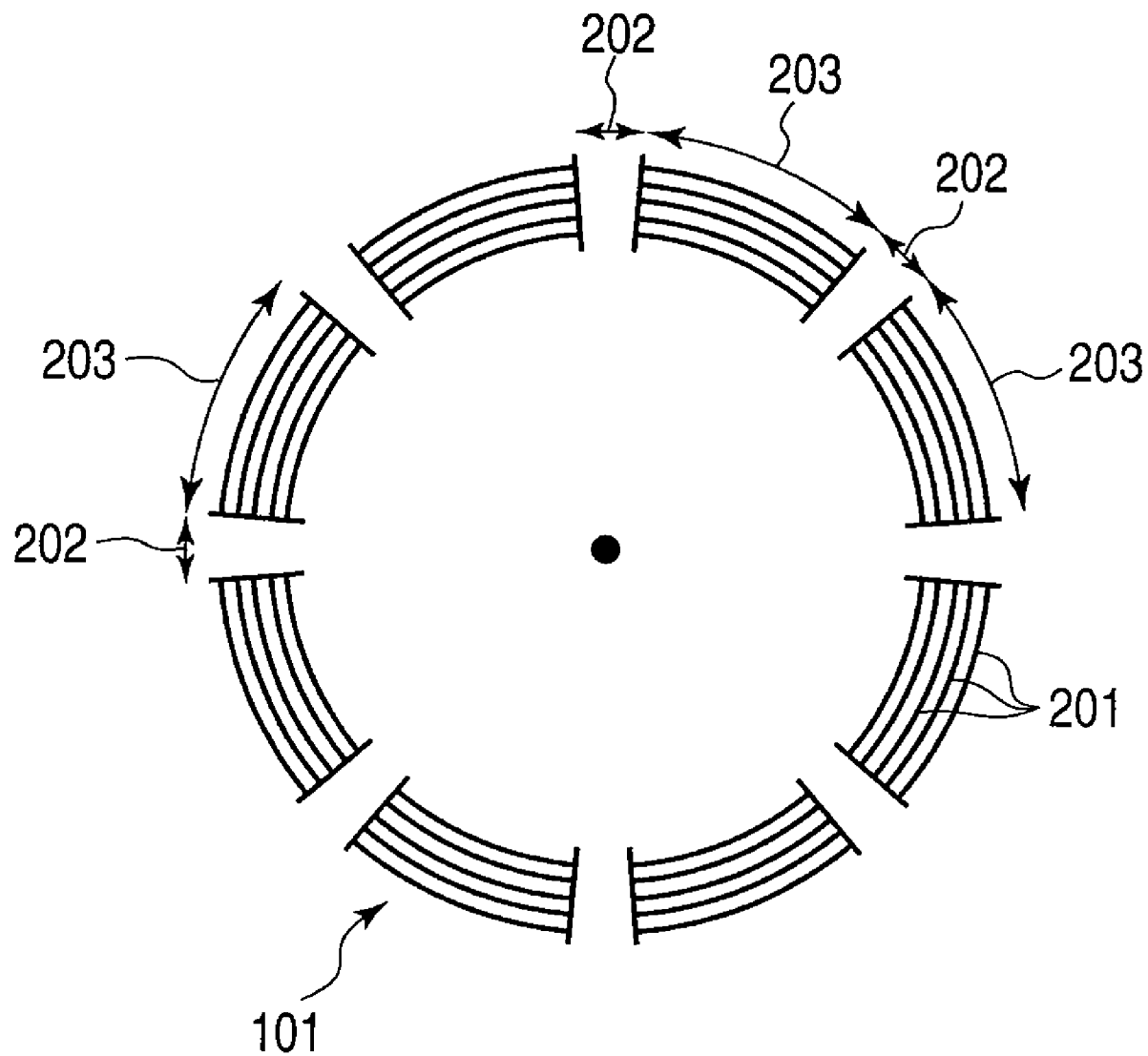
FIG. 2 is a conceptual diagram showing an exemplary format of the disk shown in FIG. 1 and also illustrating exemplary arrangement of tracks.

Various embodiments according to the invention will be described hereinafter with reference to the accompanying drawings. In general, according to one embodiment of the invention, a storage apparatus is provided. This storage apparatus comprises: a disk configured to allocate at least one track as a backup-track; and a controller configured to control a data refresh operation comprising a refresh-data read operation of reading L blocks of data by a head from a track to be refreshed on the disk, a data backup-write operation of writing the read data by the head to the backup-track, and a refresh-write operation of writing the read data by the head to the track to be refreshed after the backup-write operation, and configured to set the number L of blocks to a value that satisfies conditions for completing the backup-write operation and the refresh-write operation within a time corresponding to N revolutions of the disk from completion of the refresh-data read operation.

FIG. 1 is a block diagram showing a configuration of a magnetic disk drive (HDD) according to an embodiment of the invention. The HDD 100 shown in FIG. 1 is a storage apparatus which writes data to a recording surface of a disk (magnetic disk) 101 and reads data from the recording surface, in response to a request from a host system 200. The host system 200 is an electronic apparatus such as a personal computer which utilizes the HDD 100 as a storage apparatus.

The disk 101 is fixed to a spindle motor (SPM) 103 and is rotated at a constant speed by driving the SPM 103. For example, one disk surface of the disk 101 is a recording surface on which data may be magnetically recorded. A head (magnetic head) 102 is arranged over the recording surface of the disk 100. The head 102 is fixed to one end of an actuator 105. The other end of the actuator 105 is fixed to a voice coil motor (VCM) 104. The head 102 moves over a range of a circular trajectory around a pivot of the VCM 104 which range overlaps the surface of the disk 101.

The HDD 100, which includes a single disk 101, is assumed in the configuration in FIG. 1. However, in another configuration, a plurality of disks 101 may be fixed to the SPM 103 so that a gap of a certain size is formed between the disks 101. In this case, the plurality of actuators 105 are stacked and fixed to the VCM 104 so that the arrangement of the actuators 105 is adapted for gaps between the plurality of disks 101. The head 102 is fixed to one end of each of the plurality of actuators 105. Thus, the driving of the SPM 103 simultaneously rotates all the disks 101. The driving of the VCM 104 simultaneously moves all the heads 102. In the configuration in FIG. 1, one surface of the disk 101 is the recording surface. However, both surfaces of the disk 101 may be recording surfaces, with the heads 102 arranged over the respective recording surfaces.

FIG. 2 is a conceptual drawing showing a format of the disk 101 including a track arrangement. In FIG. 2, a plurality of tracks 201 are concentrically arranged on the recording surface of the disk 101. Data received from the host system 200 by the HDD 100 is recorded in at least one of the plurality of tracks 201 in accordance with an address designated by the host system.

Servo areas 202 and data areas 203 are alternately arranged on the plurality of tracks on the disk 101, at equal intervals. A servo signal used to position the head 102 is recorded in each of the servo areas 202. The data areas 203 are used for storing data transferred by the host system 200.

A recording format known as "constant density recording (CDR) format" is applied to the disk 101. A recording surface of the disk 101, which has the CDR format, is divided into zones (CDR zones) arranged in the radial direction of the disk 101. The recording surface is managed, zone by zone. The closer each CDR zone is located to the outer circumference of the disk, the more data sectors (hereinafter, called "sector") it has per track (cylinder).

Referring back to FIG. 1, a CPU 115 functions as a main controller for the HDD 100. The CPU 115 executes control for starting and stopping the SPM 103 and maintaining the rotational speed of the SPM 103, via a motor driver 106. The CPU 115 controls the driving of the VCM 104 via the motor driver 106 to move the head 102 to a target track and to settle the head 102 within a target range for the target track. The control for moving the head 102 to the target track is called seek control. The control for settling the head 102 within the target range for the target track is called head positioning control. The CPU 115 further executes control for refreshing the data written to the track 201 on the disk 101 (i.e., control of a data refresh operation).

The positioning of the head 102 is executed while the SPM 103 is rotating steadily after being started. As described above, the servo areas 202 (see FIG. 2) are arranged in a circumferential direction of the disk 101 at equal intervals. Thus, servo signals recorded in the servo areas 202 appear at temporally equal intervals in an analog signal read from the disk 101 by the head 102 and amplified by a head IC 107. A read/write IC 108 (a servo module 121 included in the read/write IC 108) and a gate array 109 utilize this condition to process the analog signal to generate a signal for positioning of the head 102. Based on this signal, the CPU 115 controls the motor driver 106 to allow the motor driver 106 to supply a current (VCM current) for the positioning of the head 102 from the motor driver 106 to the VCM 104 in real time. The CPU 115 controls the SPM 103 and the VCM 104 via the motor driver 106 as described above, while controlling some other components of the HDD 100 and executing a command process. The CPU 115 is connected to a CPU bus 112.

To the CPU bus 112, a read/write IC 108, a gate array 109, a disk controller (HDC) 110, a RAM 113, and a flash ROM 114 are connected. The flash ROM 114 is a volatile memory, to which data can be rewritten. In this embodiment, the CPU 115 controls the data rewriting to the flash ROM 114. The flash ROM 114 stores a program that the CPU 115 should execute. The CPU 115 executes the program, executing the above-mentioned control. The flash ROM 114 also stores a block-number table 600 (see FIG. 6), which will be described later.

The RAM 113 is provided to store various variables that the CPU 115, for example, uses. A part of storage area provided in the flash RAM 114 is used as a work area for the CPU 115. Another part of the storage area is used to hold a write count table 500 (see FIG. 5).

The read/write IC 108 includes a servo module 121 and a read/write module 122. The servo module 121 executes signal processing required for the positioning of the head 102. The signal processing includes the extraction of the servo signal. The read/write module 122 executes signal processing for a data read and a data write. The gate array 109 generates control signals, including a signal for the servo module 121 to extract the servo signal.

The HDC 110 is connected not only to the CPU bus 112, but also to the read/write IC 108, the gate array 109 and a buffer RAM 111. The HDC 110 includes a host module 123, a read/write module 124, and a buffer module 125. The host module 123 includes a host interface function of receiving commands (write command, read command, and the like) transferred by the host system 200 and controlling data transfers between the host system 200 and the HDC 110. The read/write module 124 is connected to the read/write IC 108 and the gate array 109 to read and write data via the read/write IC 108. The buffer module 125 controls the buffer RAM 111. A part of the storage area of the buffer RAM 111 is used as a write buffer in which data (write data) to be written to the disk via the HDC 110 (the read/write module 124 in the HDC 110) is temporarily stored. Another part of the storage area of the buffer RAM 111 is used as a read buffer in which data (read data) read from the disk 101 via the HDC 110 is temporarily stored.

The read/write IC 108, the gate array 109 and the HDC 110 include respective control registers (not shown in the drawings). Each of these control registers is assigned to a part of a memory space for the CPU 115. The CPU 115 accesses the partial area to control the read/write IC 108, the gate array 109, or the HDC 110 via the corresponding control register.

With the HDD 100 in FIG. 1, a data read is executed as follows. First, a signal (analog signal) read from the disk 101 by the head 102 is amplified by the head IC 107. The amplified analog signal is separated into a servo signal and a data signal by the read/write IC 108. The data signal is decoded by the read/write module 122 in the read/write IC 108 and then transmitted to the HDC 110. The read/write module 124 in the HDC 110 processes the decoded data signal in accordance with a control signal from the gate array 109 to generate data to be transferred to the host system 200. The processing in this case includes detection and correction of a possible error in data based on ECC data described below. The generated data is stored in the buffer RAM 111 by the buffer module 125 in the HDC 110 and then transferred to the host system 200 by the host module 123 in the HDC 110.

With the HDD 100 in FIG. 1, a data write is executed as follows. Data transferred to the HDC 110 by the host system 200 is received by the host module 123 provided in the HDC 110. The buffer module 125 in the HDC 110 then stores the data in the buffer RAM 111. The data stored in the buffer RAM 111 is extracted by the buffer module 125. The data is then transmitted to the read/write IC 108 by the read/write module 124 in the HDC 110 in accordance with a control signal from the gate array 109. The data transmitted to the read/write IC 108 is encoded by the read/write module 122 in the read/write IC 108. The encoded data is transmitted to the head 102 via the head IC 107 and then written to the disk 101 by the head 102. The above-described data read and write are executed under the control of the CPU 115.

Figure 3A:
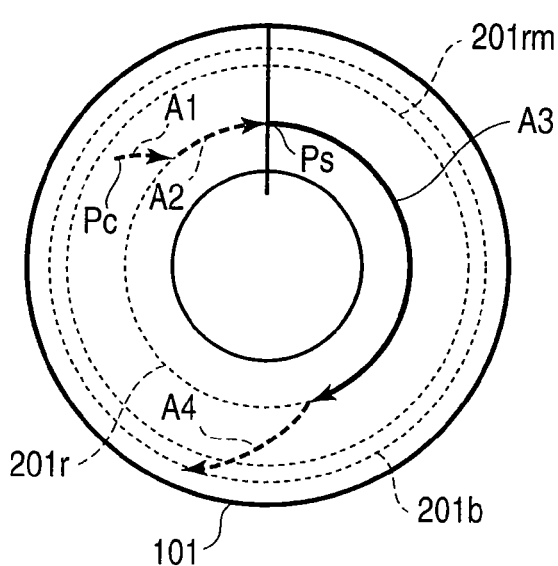
FIGS. 3A and 3B are conceptual diagrams showing an exemplary data refresh operation used in the embodiment.
Figure 3B:
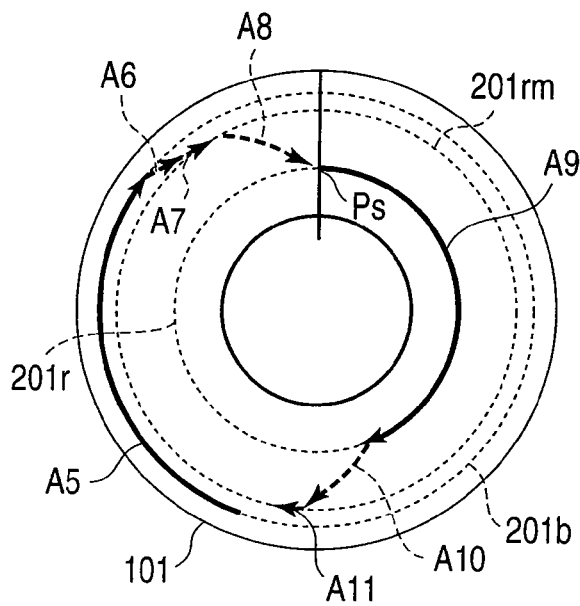
Figure 3C:
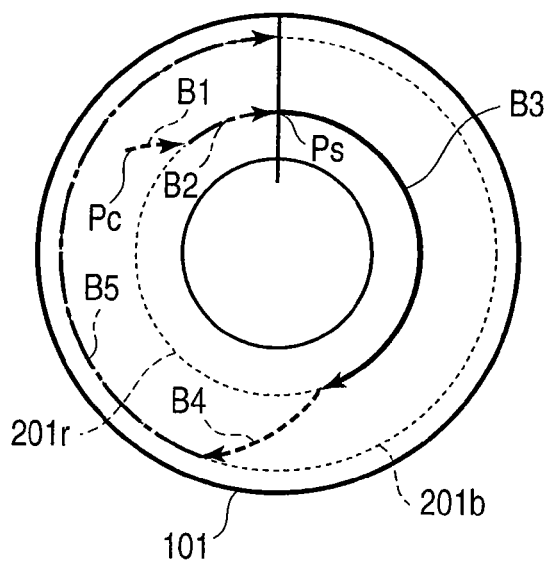
FIGS. 3C and 3D are conceptual diagrams showing a concept of a data refresh operation that may be generally used if a specified track provided on the disk is used as a backup-track.
Figure 3D:
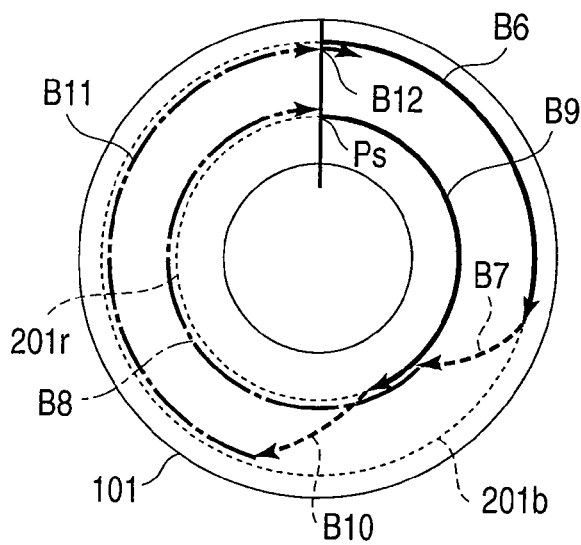
Figure 4:
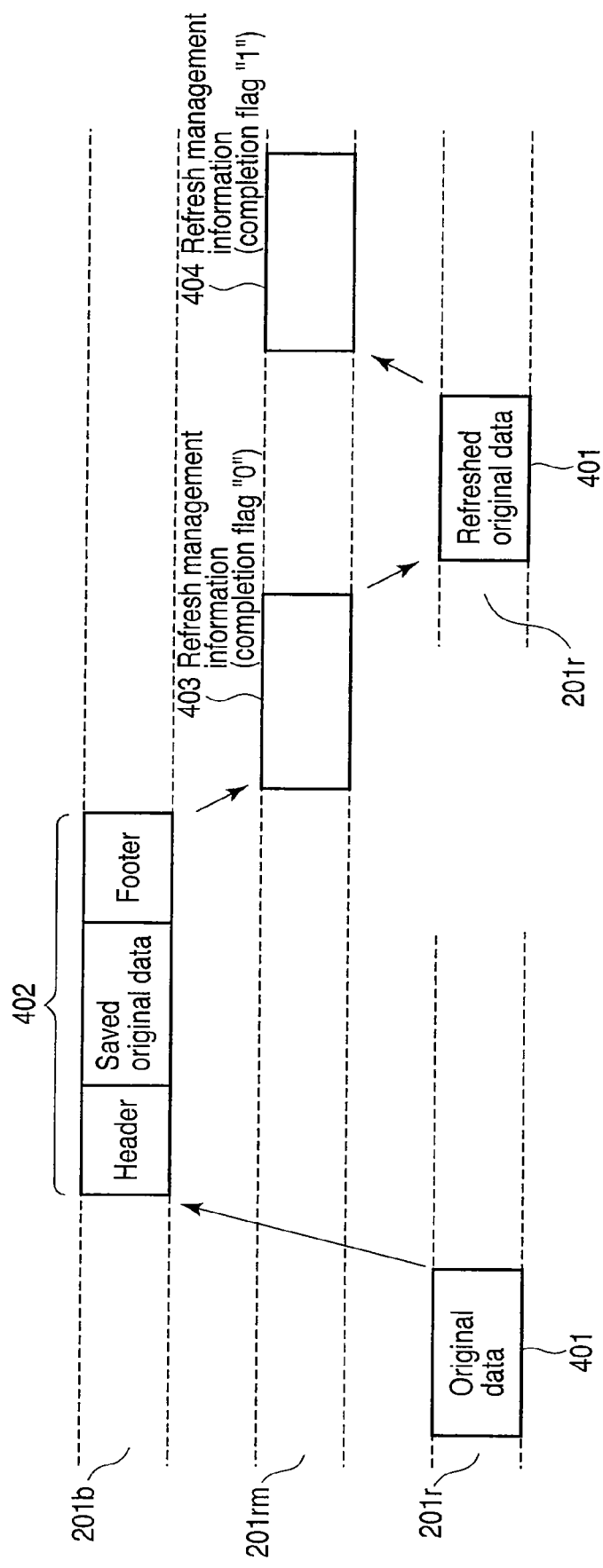
FIG. 4 is a conceptual diagram explaining an exemplary data refresh operation used in the embodiment, mainly in terms of the data-read from, and data-write to, a track on the disk.

The concept of the data refresh operation the HDD 100 of FIG. 1 executes will be explained with reference to FIGS. 3A to 3D and FIG. 4. FIGS. 3A and 3B are conceptual diagrams showing the locus that the head 102 traces while moving over the disk 101, thus explaining a data refresh operation (hereinafter, referred to as "first data refresh operation") executed in the embodiment. FIGS. 3C and 3D are conceptual diagrams showing the locus that the head 102 traces while moving over the disk 101, thus explaining another data refresh operation (hereinafter, referred to as "second data refresh operation") usually executed when a specified track on the disk 101 is used as a backup-track. FIG. 4 is a conceptual diagram explaining the first data refresh operation, mainly in terms of the data-read from, and data-write to, a track on the disk 101.

The second data refresh operation will be explained first, with reference to FIGS. 3C and 3D. In the case of FIG. 3C and FIG. 3D, a track 201 near the outer circumference of the disk 101 is allocated as a backup-track 201b, and a track 201 near the center of the disk 101, at which the data refresh operation should be executed, is represented as a refresh-track 201r.

Shown in FIGS. 3C and 3D are loci B1 to B12 that the head 102 traces as Steps B1 to B12 of the second data refresh operation are executed in sequence. That is, reference numbers B1 to B12 indicate not only the sequence of the second data refresh operation, but also the loci the head 102 traces during the second data refresh operation.

In the second data refresh operation, a seek operation B1 is first executed, moving the head 102 to the refresh-track 201r from the present position Pc. During the seek operation B1, the head 102 traces the locus B1. Then, a so-called "rotational delay" B2 occurs, which lasts until a refresh-write start position Ps on the refresh-track 201r reaches the head 102 as the disk 101 is rotated. During the rotational delay B2, the locus B2 is traced.

Next, a refresh-data read operation B3 is executed, reading data (i.e., original data) to be refreshed, from a storage area on the refresh-track 201r that extends from the refresh-write start position Ps. In the refresh-data read operation B3, a locus B3 is traced. Then, a seek operation B4 is executed, moving the head 102 to the backup-track 201b from the position where the refresh-data read operation B3 has been completed. During the seek operation B4, the locus B4 is traced. A rotational delay B5 then occurs, lasting until a predetermined backup-write start position on the backup-track 201b (e.g., a leading sector on the track 201b) reaches the head 102 moved to the backup-track 201b. During the rotational delay B5, the locus B5 is traced.

Further, a backup-write operation B6 is executed, writing (or saving) the data read during the refresh-data read operation B3 to the storage area on the backup-track 201b that extends from the backup-write start position (i.e., backup-write start sector). During the backup-write operation B6, the locus B6 is traced. In the backup-write operation B6, not only the original data, but also refresh-management information is written to the backup-track 201b. The refresh-management information comprises the execution address (start address) used in the refresh-data read operation B3 and the number of blocks constituting the original data read in the refresh-data read operation B3. The execution address represents the refresh-write start position Ps.

A seek operation B7 is executed to move the head 102 to the refresh-track 201r from the position where the backup-write operation B6 has been completed. During the seek operation B7, the locus B7 is traced. A rotational delay B8 then occurs, which lasts until the refresh-write start position Ps on the refresh-track 201r reaches the head 102 thus moved to the refresh-track 201r. During this rotational delay B8, the locus B8 is traced.

A refresh-write operation B9 is then executed to write the original data read in the refresh-data read operation B3, back to the storage area on the refresh-track 201r that extends from the refresh-write start position Ps. During this refresh-data write operation B9, the locus B9 is traced. Then, a seek operation B10 is executed, moving the head 102 again to the backup-track 201b from the position where the refresh-write operation B9 has been completed. During the seek operation B10, the locus B10 is traced.

Then, a rotational delay B11 occurs, which lasts until the backup-write start position on the backup-track 201b reaches the head 102 moved again to the backup-track 201b. During this rotational delay B11, the locus B11 is traced. Next, there is executed an operation B12 of rewriting the refresh-management information written to the storage area on the backup-track 201b extending from the backup-write start position, to refresh-management information that comprises a completion flag indicating the completion of the refresh-write operation. During this operation B12, the locus B12 is traced. Upon the completion of the operation B12, the second data refresh operation is terminated. In the second data refresh operation shown in FIGS. 3C and 3D, a rotational delay occurs, which is equivalent to the time the disk 101 needs to rotate about three times.

The first data refresh operation executed in this embodiment will now be explained with reference to FIGS. 3A and 3B. Assume that in the case of FIGS. 3A and 3B, too, a track 201 near the outer circumference of the disk 101 is allocated as a backup-track 201b, and a track 201 near the center of the disk 101, at which the data refresh operation should be executed, is represented as a refresh-track 201r as in the case of the FIGS. 3C and 3D. In FIGS. 3A and 3B, one backup-track 201b and one refresh-track 201r are shown. Instead, a plurality of backup-tracks 201b of consecutive cylinder numbers and a plurality of refresh-tracks 201r of consecutive cylinder numbers may be provided on the disk 101.

Shown in FIGS. 3A and 3B are loci A1 to A11 that the head 102 traces as Steps A1 to A11 of the first data refresh operation are executed in sequence. That is, reference numbers A1 to A11 indicate not only the sequence of the first data refresh operation, but also the loci the head 102 traces during the first data refresh operation.

In the first data refresh operation, a seek operation A1 is first executed, moving the head 102 from the present position Pc to the refresh-track 201r, as in the second data refresh operation. During the seek operation A1, the head 102 traces the locus B1. Then, a rotational delay A2 occurs, which lasts until the refresh-write start position Ps on the refresh-track 201r reaches the head 102 as the disk 101 is rotated. During the rotational delay A2, the locus B2 is traced.

Next, a refresh-data read operation A3 is executed, reading original data to be refreshed, from a storage area on the refresh-track 201r that extends from the refresh-write start position Ps. During the refresh-data read operation A3, a locus A3 is traced. Then, a seek operation (first seek operation) A4 is executed, moving the head 102 to the backup-track 201b from the position where the refresh-data read operation A3 has been completed. During the seek operation A4, the locus A4 is traced. Up to this point, the first refresh process is identical to the second data refresh operation.

When the seek operation A4 is completed, a backup-write operation A5 is executed. In the backup-write operation A5, a sector corresponding to the position on the backup-track 201b where the head 102 has reached is set as backup-write start sector. The "sector corresponding to the position on the backup-track 201b where the head 102 has reached" is the sector that reaches the head 102 before any other sector of the backup-track 201b does after the seek operation A4 has been completed. In the backup-write operation A5, the original data (data to be refreshed) read in the previous refresh-data read operation A3 is written to the storage area 402 (see FIG. 4) on the backup-track 201b that extends from the backup-write start sector. Moreover, in the backup-write operation A5, a header and a footer are added to the head and tail of the original data written to the storage area 402, respectively. The header and the footer contain refresh-management information each. The refresh-management information will be described later.

As clearly seen from the backup-write operation A5 described above, in the first data refresh operation, virtually no time elapses from the completion of the seek operation A4 to the start of the backup-write operation A5. (That is, there is no rotational delay.) In this regard it should be noted that no backup-write start sectors are prescribed in the first data refresh operation, unlike in the second data refresh operation. During the backup-write operation A5, the locus A5 is traced.

Next, a seek operation (third seek operation) A6 is executed, moving the head 102 from a position over the backup-track 201b, at which the backup-write operation A5 has been completed, to the track 201 (i.e., refresh-management track 201) to which refresh-management information should be written. In the case of FIGS. 3A and 3B, the refresh-management track 201 is denoted as refresh-management track 201rm. That is, the track 201 adjacent to the backup-track 201b and located closer than the backup-track 201b to the center of the disk 101 is allocated as refresh-management track 201rm. In the case of FIGS. 3A and 3B, the locus A6 is traced during the seek operation A6.

On completion of the seek operation A6, a refresh-management information write operation A7 is executed to write the refresh-management information to a sector (storage area) 403 (see FIG. 4) corresponding to the position on refresh-management track 201rm where the head 102 has reached. Therefore, virtually no rotational delay occurs in the period between the completion of the seek operation A6 and the start of the refresh-management information write operation A7. During the refresh-management information write operation A7, the locus A7 is traced.

The refresh-management information written to the sector 403 on the refresh-management track 201rm, in the refresh-management information write operation A7, contains two execution addresses (start addresses), data representing the number of blocks, a completion flag, and a count value. The execution addresses are each composed of a cylinder address, a head address and a sector address. One of the execution addresses is used in the refresh-data read operation A3 and represents refresh-write start position Ps at which the refresh-write operation is commenced. The other execution address represents the backup-write start position from which the storage area extends in the backup-track 201b and at which the data (original data) has been written in the backup-write operation A5 and the backup-write operation has been started. The number of blocks represents the number of the blocks that constitute the data read in the refresh-data read operation A3 and written in the backup-write operation A5.

In the refresh-management information write operation A7, the refresh-management information is written to the sector 403 (see FIG. 4) of the refresh-management track 201rm. The completion flag contained in the refresh-management information is clear. As long as this flag is clear ("0"), it indicates that refresh-write operation has not been completed yet. The count value contained in the refresh-management information is a value, which is incremented every time data is written to the refresh-management track 201rm. Then, a seek operation (second seek operation) A8 is executed to move the head 102 to the refresh-track 201r from the refresh-management track 201rm at which the refresh-management information write operation A7 has been completed. During this seek operation A8, the locus A8 is traced. Assume that the refresh-management information contained in the header and footer added to the head and tail of the original data (i.e., data to be refreshed) now written to the backup-track 201b is identical to the refresh-management information written to the refresh-management track 201rm in the refresh-management information write operation A7.

In the present embodiment, the number of blocks (sectors) that should be backup-written and refresh-written is set so that the position on the backup-track 201b where the head 102 reaches at the completion of the seek operation A8 may corresponds to the sector located at the refresh-write start position Ps. The number of blocks for the backup-track 201b and the number of blocks for the refresh-track 201r are not always equal to each other in the embodiment because CDR is applied as the recording format of the disk 101 in the present embodiment.

Hence, the data to be refreshed is composed of L blocks (sectors), i.e., blocks to be backup-written and refresh-written (hereinafter, called "refresh-blocks"), so that the backup-write operation A5 and refresh-write operation A9 (described later) may be completed after the refresh-data read operation A3, within a time corresponding to N revolutions of the disk 101. Note here that L and N are natural numbers. The number L of refresh-blocks (i.e., number of blocks that should be refreshed) is set based on the fact that the number of blocks per track differs depending on the CDR zone and on the time that is required for the seek operations (first and second seek operations) A4 and A8.

The position the head 102 takes when the seek operation A8 is completed corresponds to the refresh-write start position Ps on the refresh-track 201r. Therefore, at the completion of the seek operation A8, the refresh-write operation A9 is immediately executed to write back the original data read in the refresh-data read operation A3, to a storage area 401 (see FIG. 4) on the refresh-track 201r that extends from the refresh-write start position Ps. There is substantially no time between the completion of the seek operation A8 and the start of the refresh-write operation A9. In other words, virtually no rotational delay occurs. In the case of FIGS. 3A and 3B, the locus A9 is traced during the refresh-write operation A9.

Next, a seek operation (fourth seek operation) A10 is executed, moving the head 102 to the refresh-management tack 201rm from the position on the refresh-track 201r at which the refresh-write operation A9 has been completed. During the seek operation A10, the locus A10 is traced. When the seek operation A10 is completed, a refresh-management information write operation A11 is executed, writing the refresh-management information to a sector 404 corresponding to the position on the refresh-management track 201rm where the head 102 has reached. During the refresh-management information write operation A11, the locus A11 is traced. When the refresh-management information write operation A11 is completed, the first data refresh operation comes to an end.

As described above, in the first data refresh operation (FIGS. 3A and 3B), the number of blocks to be refreshed (hereinafter, referred to as "refresh-block-number") is set so that the backup-write operation A5 and refresh-write operation A9 may be completed within a time corresponding to N revolutions of the disk 101. The rotational delay can therefore be reduced to about 1.5 revolutions of the disk 101 in the first data refresh operation shown in FIGS. 3A and 3B.

Like the refresh-management information (hereinafter called "first refresh-management information") written to the sector 403 of the refresh-management track 201rm during the refresh-management information write operation A7, the refresh-management information (hereinafter called "second refresh-management information") written to the sector 404 of the refresh-management track 201rm during the refresh-data write operation A11 contains a completion flag and a count value. Nonetheless, unlike the completion flag contained in the first refresh-management information, the completion flag contained in the second refresh-management information is set ("1"), and indicates that the refresh-write operation has been completed (that is, the original data has been refreshed).

Therefore, the second refresh-management information containing a completion flag that indicates the completion of the refresh-write operation may not be written if the supply of power to the HDD 100 is interrupted during the refresh-write operation, not completing the refresh-write operation. Whether the refresh-write operation has been completed can therefore be determined in accordance with whether the latest second refresh-management information is written to the refresh-management track 201rm. That is, the completion of the refresh-write operation is determined if the latest refresh-management information (i.e., second refresh-management information) showing the completion of the refresh-write operation is written to the refresh-management track 201rm.

The count value contained in the second refresh-management information is greater by one than the count value contained in the first refresh-management information that is written to the refresh-management track 201rm during the latest refresh-management information write operation A7.

In the present embodiment, the sector to which the refresh-management information is written in the refresh-data write operation A11 is not always identical to the sector (i.e., sector in the refresh-management track 201rm) to which the refresh-management information is written in the refresh-data write operation A7. Nevertheless, the count value contained in the refresh-management information is incremented every time data is written to the refresh-management track 201rm. Thus, if refresh-management information items are written to a plurality of sectors of the refresh-management track 201rm, the refresh-management information item containing a count value greater than the count value contained in any other refresh-management information item can be identified as the latest refresh-management information item. From the state of the completion flag contained in the latest refresh-management information, it can be determined (i.e., detected) whether a refresh-write operation has been completed on the data stored in the storage area on the disk 101, which is designated by the execution address and the block number, both contained in the refresh-management information.

A calculation will be explained, which sets such a number L of refresh-blocks (hereinafter, called "refresh-block-number L") as would serve to complete both the backup-write operation A5 and the refresh-write operation A9, within the time corresponding to N revolutions of the disk 101, or within the time the disk 101 needs to rotate N times. The refresh-block-number L represents the number of blocks which constitute data written in the first backup-write operation A5 and first refresh-write operation A9.

In the present embodiment, only one block suffices to write the refresh-management information. This amount of data is far less than L refresh-blocks. Thus, the time required to write the refresh-management information need not be considered for the present embodiment. Even if the time is not considered, the calculation of the refresh-block-number L will be scarcely influenced. Of course, the time may be taken into account in calculating the refresh-block-number L.

Assume that the head 102 needs 20 ms to move from the refresh-track 201r to the backup-track 201b, or vice versa, thereby to execute a seek operation. Also assume that the CDR zone including the refresh-track 201r has 1000 blocks in each track, while the CDR zone including the backup-track 201b has 2000 blocks in each track. Further assume that the disk 101 rotates at the speed of 5400 rpm, or rotates 5400 times per minute (i.e., 60 seconds), taking 11 ms to rotate once.

Then, time Tb required to write L blocks of data to the backup-track 201b (i.e., backup-write time) is given as follows:

$$Tb[\text{ms}]=11\times(L/2000) \qquad (1)$$

Similarly, the time Tr required to write L blocks of data to the refresh-track 201r (i.e., refresh-write time) is given as follows:

$$Tr[\text{ms}]=11\times(L/1000) \qquad (2)$$

The seek time that the head 102 needs to move back and forth is expressed as "2×20." This value and the equations (1) and (2) result in the following conditional expression (3):

$$Tb + Tr + 2\times 20 = 11\times(L/2000) + 11\times(L/1000) + 2\times 0 \qquad (3)$$
$$= 11 \text{ (time required for one revolution)} \times N$$

The conditional expression (3) can be transformed to the following conditional expression (4):

$$33L = 22000 \times N - 80000 \qquad (4)$$

Natural numbers N and L that satisfy the conditional expression (4) are as follows:
N=4, and L=242
N=5, and L=909
N=6, and L=1576,
and so forth.

Of these values for L, the value that is the greatest and yet not exceeding the storage capacity of the write buffer incorporated in the buffer RAM 111 may be used as the refresh-block-number (i.e., the number of refresh-blocks). If the refresh-block-number is so set, the rotational delay can be reduced to execute the data refresh at high efficiency.

The backup-write time Tb and the refresh-write time Tr can be expressed by the following equations (5) and (6), respectively:

$$Tb[\text{ms}]=Td\times(L/Bb) \qquad (5)$$
$$Tr[mb]=Td\times(L/Br) \qquad (6)$$

where Bb is the number of blocks per track in the CDR zone including the backup-track 201b, Br is the number of blocks per track in the CDR zone including the refresh-track 201r, and Td[ms] is the time the disk 101 needs to rotate once.

Hence, the following conditional expression (7) derives:

$$Tb + Tr + 2\times Ts = Td\times(L/Bb) + Td\times(L/Br) + 2\times Ts \qquad (7)$$
$$= Td\times N$$

where Ts is the seek time that the head 102 needs to move from the refresh-track 201r to the backup-track 201b, or vice versa.

The conditional expression (7) can be transformed to the following conditional expression (8):

$$(Bb+Br)\times Td\times L = Bb\times Br\times\{(Td\times N)-2\times Ts\} \qquad (8)$$

The conditional expression (8) clearly shows that the relation between N and L can be determined from number Br of blocks, number Br of blocks, time Td the disk 101 needs to rotate once, and seek time Ts. The conditional expression (4) shows the relation N and L have if Bb, Br, Td and Ts are 2000, 1000, 11 [ms] and 20 [ms], respectively. Note that the disk 101 need not always have the CDR format. If the disk does not have this format, the backup-write time Tb and the refresh-write time Tr will be equal.

In the present embodiment, the tracks 201 arranged on the recording surface of the disk 101 are divided into groups each consisting of a predetermined number of tracks. The data refresh operation is executed on these track groups, one by one. Hereinafter, the groups shall be called "track groups." In this embodiment, the times the data write operation is repeated, for one track group, are counted as a write count. If the write count reaches a predetermined value, the data refresh operation will be executed on the track group corresponding to the write count, in units of L blocks.

FIG. 5 shows an example of the data structure of a write count table 500 holding the number of times the write operation been executed for each track group (i.e., number of data write operations). The write count table 500 is stored in, for example, a predetermined area of the RAM 113 shown in FIG. 1. In other words, the predetermined area of the RAM 113 is used as a write count storage module for storing the write count table 500.

In the example of the write count table 500, shown in FIG. 5, it is assumed, for generalization of description, that the HDD 100 includes m heads 102 and has p cylinder groups. In this case, for each of the track groups, expressed by a head (head number) h and a cylinder group (cylinder group number) c, the write count table 500 holds the number of data writes (data write operations) for each of the track groups as a write count W(h, c) ($0\leq h\leq m-1$, $0\leq c\leq p-1$). The number W(h, c) is used as a write counter that counts the number of writes for the track group specified by the head number h and the cylinder group number c. In the configuration of the HDD 100 of FIG. 1, m is 1.

The cylinder group is a set of a predetermined given number of cylinders, and the number of cylinders per cylinder group is the same as that of tracks per track group. Thus, the number of track groups present in the HDD 100 and having the same cylinder group number is equal to the number m of the heads 102. The track group is specified by the cylinder group number c and the head number h. When data is written to a track in the track group specified by the cylinder group number c and the head number h (a write access is executed), the write count W(h, c) held in the write count table 500 is incremented by the number of writes executed.

In the present embodiment, the write count table 500 is stored in the RAM 113 as pointed out above. The contents of the RAM 113 will be lost if the supply of power to the HDD 100 is interrupted. Therefore, the contents of the write count table 500 will also be lost on the interruption of the supply of power to the HDD 100. In view of this, the contents in a predetermined area of the RAM 113, which includes the write count table 500, are saved in a predetermined area of the disk 101 at appropriate time (for example, every time the HDD 100 is set to the power-saving mode). When the HDD 100 is activated (or when the power switch of the HDD 100 is turned on), the contents saved in the predetermined area of the disk 101, including the write count table 500, are read and restored back into the RAM 113.

FIG. 6 is a diagram showing an example data structure of a block-number table 600 that holds the number of blocks on each track of the CDR zone for each head (head number). The block-number table 600 is stored in a part of the storage area of the flash ROM 114. That is, a part of the storage area of the flash ROM 114 is used as a block-number storage module that stores the block-number table 600.

For generalization of description, the block-number table 600 shown in FIG. 6 is based on the assumption that the HDD 100 has m heads 102 and that the disk 101 has p CDR zones on either recording surface. In this case, for each of the CDR zones represented by the CDR zone number (zone number) z and the head number h, the block-number table 600 holds the block-number B, or the number B of blocks on any track of each of the CDR zones. Thus, the block number table 600 holds block number B (h, z) ($0 \leq h \leq m-1, 0 \leq z \leq p-1$) for each of the CDR zones. The block number table 600 is read from the flash ROM 114 when the power switch of the HDD 100 is turned on. The table 600 thus read is stored in the predetermined area of the RAM 113. The block number table 600 stored in the RAM 113 is used to calculate the above-mentioned refresh-block-number L (number L of refresh-blocks).

Figure 7:
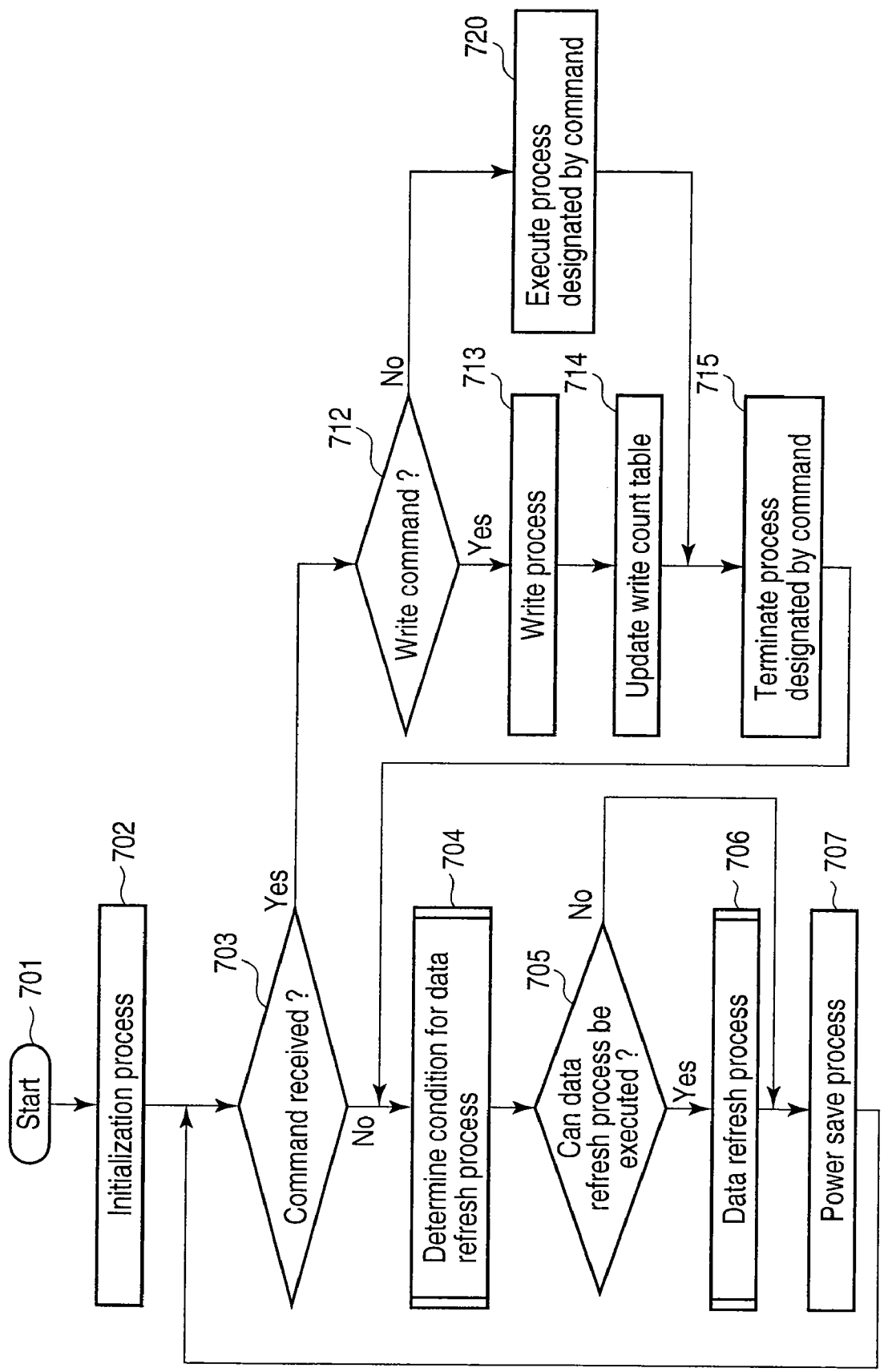
FIG. 7 is an exemplary flowchart illustrating a general operation of HDD in FIG. 1.

How the HDD 100 of FIG. 1 operates will be explained below, with reference to the flowchart of FIG. 7. Assume that the power switch of the HDD 100 is turned on, activating the CPU 115 (Block 701). Thus activated, the CPU 115 executes an initialization process that initializes and activates the other components of the HDD 100 (Block 702). Once the components have been activated, the CPU 115 becomes able to receive commands from the host system 200 via the HDC 110. The operation of the HDD 100 enters a command-waiting loop (Blocks 703 to 707).

In Block 703, the CPU 115 confirms the receipt of a command coming from the host system 200. In this case, the CPU 115 branches to Block 712, coming out of the command-waiting loop, and executes the process that accords with the command. In Block 712, the CPU 115 determines whether the command received from the host system 200 is a write command. If the command is a write command (if YES in Block 712), the CPU 115 executes the write process that the write command designates (Block 713).

When the write process (Block 713) is completed, the CPU 115 updates the write count table 500, reflecting the result of the write process in the write count table 500 (Block 714). More precisely, when the write process is executed for the track group identified with the head h and the cylinder group c, the CPU 115 updates the write count W (h, c), reflecting the write process in the write count table 500. To be more specific still, the CPU 115 adds the number of times the write process has been executed, to the write count W (h, c) recorded in the write count table 500. In most cases, one (1) is added to the write count W (h, c). If any retry is made in the write process, the number of retries made is also added to the write count W (h, c). This is because any retry influences either adjacent track, just like the ordinary write process.

When Block 714 is executed, the process based on the write command is completed. Therefore, the CPU 115 terminates the command (Block 715), executing a process including the updating of the registers and the releasing the busy state. Then, the CPU 115 returns to the command-waiting loop. If the command is other than a write command (if NO in Block 712), the CPU 115 executes the process that the command designates (Block 715), and returns to the command-waiting loop.

Assume that the CPU 115 confirms no receipt of any command in Block 703. An idling process is executed in this case. The idling process is continued even after the CPU 115 has terminated the command. The idling process includes a data refresh process the data refresh process includes the aforementioned data refresh operation. In this embodiment, the CPU 115 determines whether it should execute the data refresh operation, before it actually execute the data refresh operation (Blocks 704 and 705).

First, in Block 704, the CPU 115 determines whether the command should be immediately executed without executing the data refresh operation, or whether the data refresh operation should be evaded. The command must be immediately executed if the CPU 115 receives the command from the host system 200 immediately after Block 715. The data refresh operation should be evaded if the HDD 100 is used in undesirable conditions. The "undesirable conditions" are, for example, an application of external vibration over a specific level to the HDD 100 and an ambient temperature falling outside the tolerant range for the HDD 100.

Next, the CPU 115 determines, from the decision it has made in Block 704, whether the data refresh operation can be executed or not (Block 705). Only if the data refresh operation can be executed, the CPU 115 executes the data refresh process including the data refresh operation (Block 706). Block 706 will be described later in detail. The data refresh operation may be found to be terminated in Block 706 or not to be executed in Block 705. If this is the case, the CPU 115 goes to Block 707. In Block 707, the CPU 115 determines whether a power save process should be executed to set the HDD 100 to the power-saving mode. If YES in Block 707, the CPU 115 executes the power save process. The power save process includes an unload process of unloading the head 102 from a position over the disk 101, and/or an SPM stopping process of stopping the rotation of the SPM 103.

On executing the power save process in Block 707, the CPU 115 returns to Block 703. On the other hand, if the command received from the host system 200 must be executed at once, it is determined that the power save process should not be executed in Block 707. In this case, the CPU 115 does not execute the power save process and returns to Block 703. Then, the CPU 115 repeats the above-described process sequence that includes Block 703.

Figure 8:
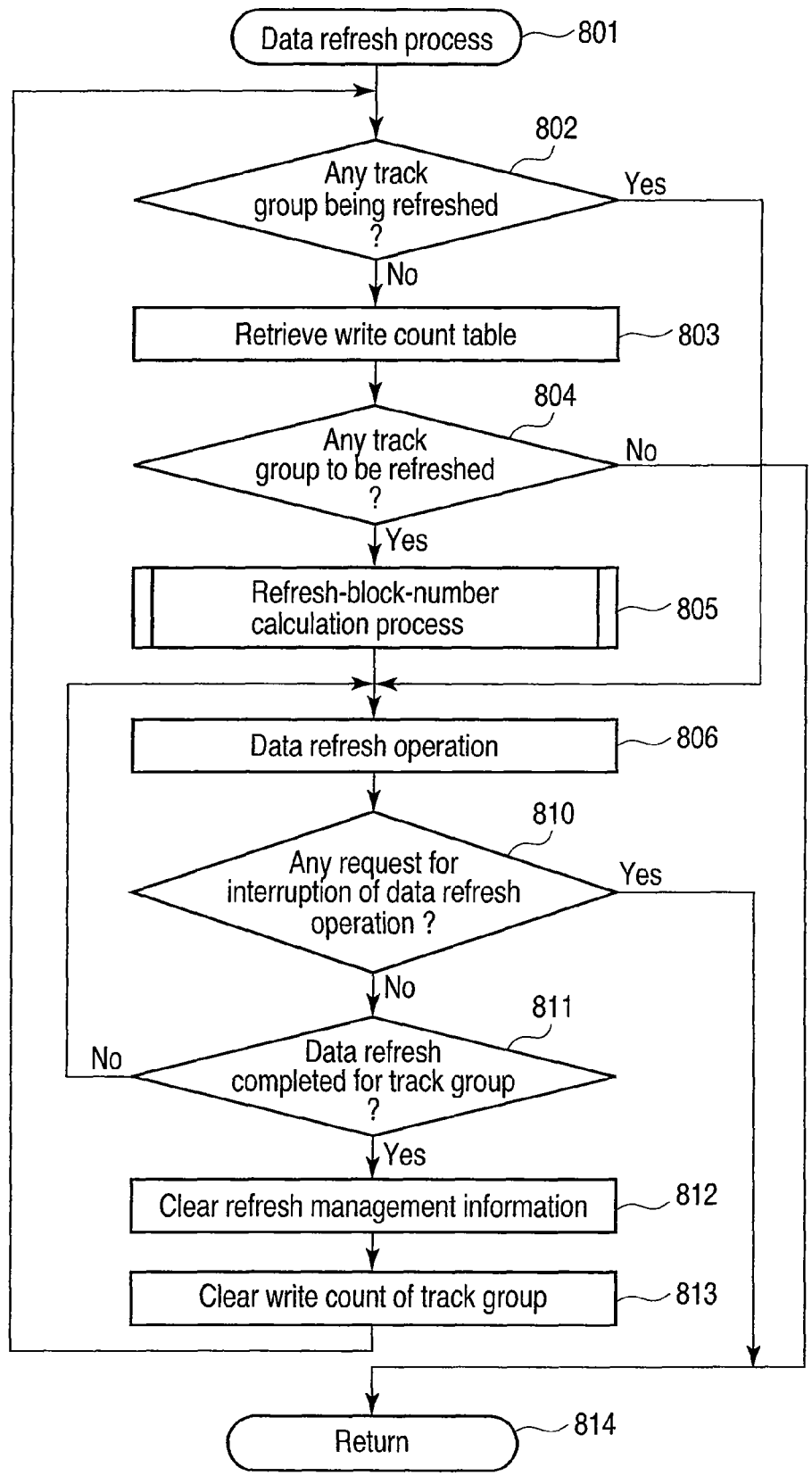
FIG. 8 is a flowchart explaining an exemplary data refresh process that is shown in the flowchart of FIG. 7.

The sequence of the data refresh process executed in Block 706 will be explained in detail, with reference to the flowchart of FIG. 8. In the data refresh process 801 shown in the flowchart of FIG. 8, the CPU 115 determines whether the data refresh operation is interrupted with respect to any track group (Block 802). Block 802 is executed, because the data refresh operation can be interrupted for a predetermined number of blocks belonging to the track group.

The reason why the CPU 115 can be programmed to interrupt the data refresh operation for the predetermined number of blocks will be explained below. It should be first noted that a long time is required to refresh all tracks of the track group. Therefore, the command received from the host system 200 during the data refresh operation cannot be executed for a long time, before the data refresh operation is completed. The response to the command received during the data refresh operation is inevitably slow. Hence, in this embodiment, the CPU 115 interrupts the data refresh operation, on receiving the command from the host system 200 via the HDC 110, in order to execute the command first.

If any of the track groups has undergone the suspension of the data refresh operation (if YES in block 802), this means that the track group to be refreshed (hereinafter, referred to as "refresh-track-group") has already been determined. In this case, the CPU 115 controls the data refresh operation (Block 806) in such a way as explained with reference to FIGS. 3A and 3B.

If no refresh-track-group has undergone the suspension of the data refresh operation (if NO in block 802), the CPU 115 searches the write count table 500 for a new refresh-track-group (Block 803). More precisely, the CPU 115 retrieves the largest write count W (h, c) in the write count table 500. Then, the CPU 115 determines whether any track group (refresh-track-group) should undergo the data refresh operation, in accordance with whether the write count W (h, c) retrieved exceeds a predetermined value (Block 804).

If the write count W (h, c) retrieved exceeds the predetermined value (if YES in Block 804), the CPU 115 determines that a track group exists, which should undergo the data refresh operation, and that this track group is associated with the write count W (h, c) retrieved or identified with the head number h and cylinder group c. Thus, if a track group (i.e., refresh-track-group to undergo the data refresh operation) is determined to exist, the track group (i.e., the track group associated with the largest write count W (h, c)) will be identified, too. If this is the case, the CPU 115 executes the process preceding the data refresh operation (Block 806), i.e., refresh-block-number calculation process (Block 805).

In contrast, if the write count W (h, c) retrieved does not exceed the predetermined value (if NO in Block 804), the CPU 115 determines that no track groups need to undergo the data refresh operation. In this case, the data refresh operation need not be controlled at all. The CPU 115 therefore branches from Block 804 to Block 814 in order to complete the data refresh process 801. Thus, Block 707 shown in the flowchart of FIG. 7 is executed.

In Block 805, the CPU 115 executes the refresh-block-number calculation process to calculate refresh-block-number L (i.e., the number of refresh-blocks that should be processed in one data refresh operation). The data refresh operation includes a backup-write operation (A5) and a refresh-write operation (A9). The refresh-block-number L is calculated from the block number table 600, in accordance with the conditional expression (8) mentioned above. The refresh-block-number calculation process (Block 805) will be described later in detail.

The CPU 115 controls the data refresh operation (Block 806) including the backup-write operation and the refresh-write operation, on as many blocks as indicated by the refresh-block-number L calculated. Having executed the data refresh operation (Block 806), or having refreshed as many blocks as indicated by the refresh-block-number L, the CPU 115 determines whether a request has been made for the interruption of the data refresh operation (Block 810). The receipt of a command from the host system 200 is one of the conditions for determining whether a request has been made for the interruption of the data refresh operation. When the host module 123 provided in the HDC 110 receives a command from the host system 200, the HDD 100 immediately goes into a busy state, owning to the hardware function of the host module 123. At the same time, a flag indicating this busy state (i.e., busy flag) is set. In Block 810, the CPU 115 checks the state of the busy flag.

Note that the busy flag is set, no matter whether the data refresh operation is proceeding or not. Therefore, the time within which to respond to the command and which the host system 200 recognizes is the sum of the time that elapses from the issuance of the command until the data refresh operation is completed and the time for which the command should properly executed. Consequently, the readiness of response to the command will decrease if the command is not executed until data is refreshed in all tracks of the refresh-track-group that should undergo the data refresh operation.

In order to prevent a decrease in the readiness of response to the command, whether a request has been made for the interruption of the data refresh operation is determined every time L blocks are refreshed (Block 810). If the request for the interruption of the data refresh operation is made as in the case where a command is received from the host system 200 during the data refresh operation (if YES in Block 810), the CPU 115 branches to Block 814. That is, the CPU 115 immediately interrupts the data refresh process including the data refresh operation, terminating Block 706 (see FIG. 7), in order to start a process in response to the command coming from the host system 200. The CPU 115 then executes Block 707. In Block 707, too, the CPU 115 immediately returns to Block 703 and then executes a process similar to Block 810 to start a process for the command coming from the host system 200.

The request for the interruption of the data refresh operation may not be made (that is, NO in Block 810). In this case, the CPU 115 determines whether all tracks of the refresh-track-group have undergone the data refresh operation (Block 811). If all tracks of the refresh-track-group have not undergone the data refresh operation (if NO in Block 811), the CPU 115 returns to Block 806 and keeps controlling the data refresh operation. If all tracks of the refresh-track-group have undergone the data refresh operation (if YES in Block 811), the CPU 115 branches to Block 812, coming out of a process loop (Blocks 806, 810 and 811, i.e., track group process loop).

In Block 812, the CPU 115 clears the refresh-management information, indicating that all tracks of the refresh-track-group have undergone the data refresh operation and that no track groups are now undergoing the data refresh operation. Having cleared the refresh-management information, the CPU reliably can makes a decision in Block 802 after it has returned to Block 802 from Block 813, which will be described later.

Having executed Block 812, the CPU 115 initializes (or clears), to zero (0), the write count W (h, c) held in the write count table 500 in association with the refresh-track-group that has undergone the data refresh operation (Block 813). The write count W (h, c) held in the write count table 500 represents the number of times data has been written to the track group. The write count W (h, c) is correlated to the degradation degree of the data stored in each track of the associated track group. Therefore, the write count W (h, c) is used, for convenience, as information showing the degradation degree of the data. Immediately after undergoing the data refresh operation, the refresh-track-group has no data degraded. To reflect this fact, the write member W (h, c) associated with the refresh-track-group is initialized to zero (0) as described above.

After executing Block 813, the CPU 115 returns to Block 802 again and starts processing the next refresh-track-group.

From Block 802, the CPU 115 always branches to Block 803. In Block 803, the CPU 115 retrieves the track group that needs to undergo a data refresh operation, in the same way as explained above. Unless a request is made for the interruption of the data refresh operation, the data refresh operation is terminated only if any refresh-track-group no longer exits, which should undergo the data refresh operation (if NO in Block 804).

Figure 9:
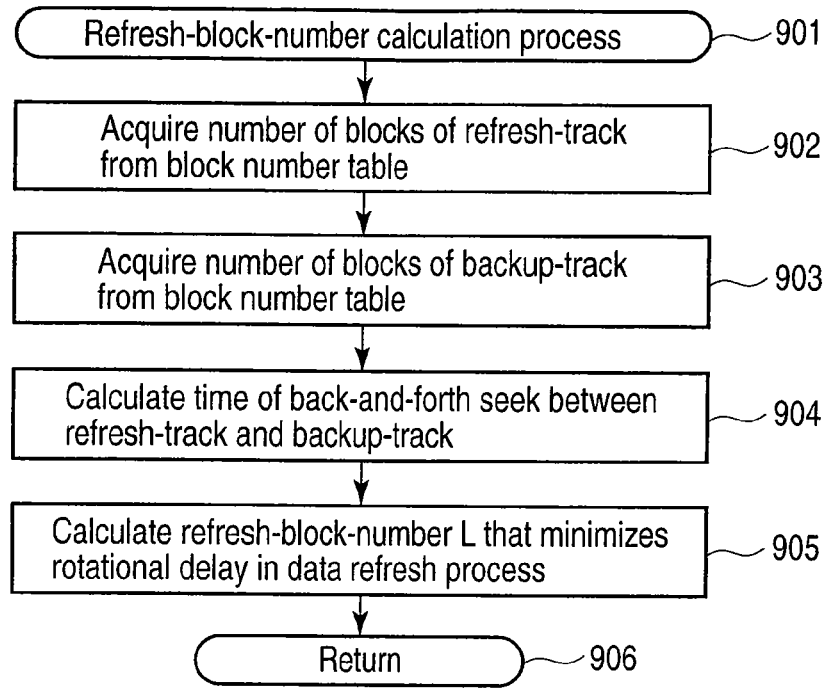
FIG. 9 is a flowchart explaining an exemplary refresh-block-number calculation process that is shown in the flowchart of FIG. 8.

The sequence of the refresh-block-number calculation process in Block 805 will be explained in detail, with reference to the flowchart of FIG. 9. First, the CPU 115 refers to the block number table 600, acquiring the number Br of blocks on each of tracks of the CDR zone including the refresh-track 201r (Block 902). The CPU 115 likewise acquires the number Bb of blocks on each of tracks of the CDR zone including the backup-track 201b (Block 903). More specifically, the CPU 115 acquires the block number Br, or B(hr, zr) held in the table 600 and associated with the zone number zr and head number hr of the refresh-track 201r. Similarly, the CPU 115 acquires the block number Bb, or B(hb, zb) held in the table 600 and associated with the zone number zb and head number hb of the backup-track 201b.

Next, the CPU 115 calculates the seek time (back-and-forth seek time), 2×Ts, which the head 102 needs to move back and forth between the refresh-track 201r and the backup-track 201b (Block 904). The CPU 115 then calculates such a refresh-block-number L as would minimize the rotational delay in the data refresh operation, by using the conditional expression (8) mentioned above, from the refresh-block-numbers Br and Bb acquired, the back-and-fourth seek time, 2×Ts, and the time Td that the disk 101 needs to rotate once (Block 905). Note that the time Td can be calculated beforehand from the rotational speed of the disk 101. On executing Block 905, the CPU 115 goes to Block 906, thus returning from the refresh-block-number calculation 901. Block 806 shown in the flowchart of FIG. 8 is thereby executed.

Figure 10:
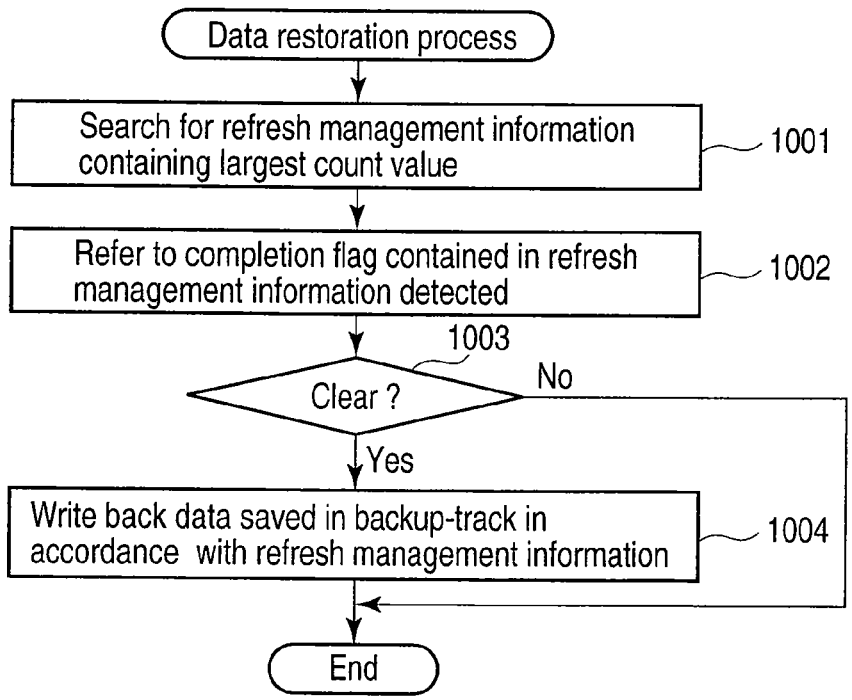
FIG. 10 is a flowchart explaining an exemplary data restoration process included in an initialization process that is shown in the flowchart of FIG. 7.

The sequence of the data restoration process included in the initialization process executed in Block 702 will be explained with reference to the flowchart of FIG. 10. First, the CPU 115 searches the refresh-management track 201rm on the disk 101 for refresh-management information that contains the largest count value (Block 1001). In this embodiment, the refresh-management information is written to the refresh-management track 201rm in refresh-management information write operations A7 and A11. Because of the characteristic of the refresh-management information write operations A7 and A11, the refresh-management information is written not always to the same sector of the refresh-management track 201rm. Nonetheless, the count value contained in the refresh-management information is incremented every time the information is written to the refresh-management track 201rm. Therefore, if refresh-management information items are written to a plurality of sectors of the refresh-management track 201rm, the refresh-management information item contains the largest count value can be identified as the latest refresh-management information. Thus, the refresh-management information detected in Block 1001 is the latest one.

The CPU 115 refers to the completion flag contained in the refresh-management information thus detected (Block 1002). The CPU 115 then determines whether the completion flag referred to is clear or not (Block 1003). If the completion flag is clear ("0"), it indicates that the latest data refresh operation has not yet been completed. In other words, the CPU 115 determines whether the completion flag is clear, thereby determining whether the supply of power to the HDD 100 has been interrupted while the refresh-write operation is proceeding. If the supply of power to the HDD 100 is interrupted during the refresh-write operation, the original data written to the track (i.e., refresh-track 201r) that should undergo the refresh-write operation may be destroyed.

If the completion flag is clear, indicating that the supply of power to the HDD 100 has been interrupted during the refresh-write operation (A9) (if YES in Block 1003), the CPU 115 controls the refresh-write operation again (Block 1004). The data thus written again to the refresh-track 201r is, however, the data (i.e., original data) written (or saved) to the backup-track 201b. Not only the start address and size (i.e., number of blocks) of the storage area on the backup-track 201b saving the original data, but also the start address and size (i.e., number of blocks) of the storage area on the refresh-track 201r in which the original data is to be written again are contained in the refresh-management information that has been searched for. In Block 1004, the seek operation A10 and the refresh-management information write operation A11 are executed in the same way as the refresh-write operation A9 in an ordinary data refresh operation, after the refresh-write operation has been completed.

MODIFICATIONS

Figure 11A:
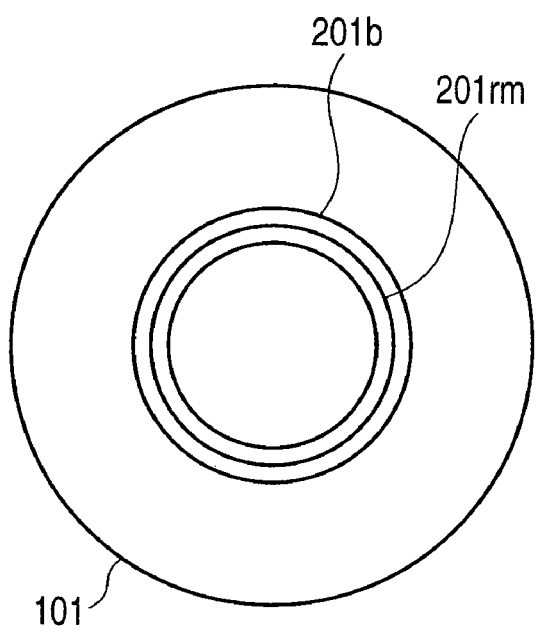
FIGS. 11A and 11B are diagrams showing the position of a backup-track and the position of a refresh-management track, which pertain to a modification of the embodiment.
Figure 11B:
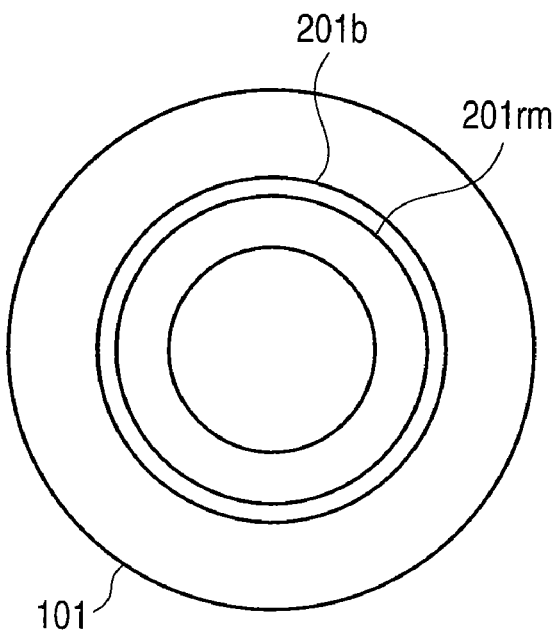

Modification of the embodiment described above will be explained. FIGS. 11A and 11B show the position of a backup-track and the position of a refresh-management track, which pertain to a modification of the embodiment. In the embodiment described above, a backup-track 201b and a refresh-management track 201rm are provided on the circumferential part of the disk 101. Instead, the backup-track 201b and refresh-management track 201rm may be provided on the center part of the disk 101 as is illustrated in FIG. 11A. Alternatively, the backup-track 201b and refresh-management track 201rm may be provided on a middle part of the disk 101 as is illustrated in FIG. 11B. Still alternatively, the backup-track 201b and the refresh-management track 201rm may take each other's position. That is, the refresh-management track 201rm may surround the circumference of the backup-track 201b. Moreover, the backup-track 201b and refresh-management track 201rm may be provided in each CDR zone of the disk 101.

The various modules of the magnetic disk drive (HDD) described herein can be implemented as software applications, hardware and/or software modules. While the various modules are illustrated separately, they may share some or all of the same underlying logical or code.

While certain embodiments of the inventions have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from spirit of the inventions. The accompanying claims and their equivalents are intended to cover such forms or modifications as would fall within the scope and spirit of the inventions.

What is claimed is:

1. A magnetic disk drive configured to perform data refreshing, the magnetic disk drive comprising:
   a magnetic disk comprising a backup-track which is used for backup of data refreshing and a refresh-track of which data is refreshed; and
   a controller configured to control a data refresh operation of reading L blocks of data written in the refresh-track, writing the read data to the backup-track, and then rewriting the read data to the refresh-track for which the reading has been performed, such that the data refresh operation corresponds to N revolutions of the magnetic disk and satisfies relations shown by a following expression:

$$(Bb+Br) \times Td \times L = Bb \times Br \times \{(Td \times N) - 2 \times Ts\}$$

where Bb is the number of blocks included in a backup-track,

Br is the number of blocks included in a track subject to data refreshing,

Td is a time period which a magnetic disk needs to rotate once,

L is the number of blocks of data written in a track subject to data refreshing, N is the number of revolutions of a magnetic disk which corresponds to data refreshing, and "2×Ts" is a seek time which a head needs to move back and forth between a track subject to data refreshing and a backup-track.

2. The magnetic disk drive of claim 1, wherein a rotational delay of the magnetic disk relating to data refreshing is reduced.

3. A controller configured to control a magnetic disk drive which performs data refreshing, wherein:

the magnetic disk drive comprises a backup-track which is used for backup of data refreshing and a refresh-track of which data is refreshed; and the controller controls a data refresh operation of reading L blocks of data written in the refresh-track, writing the read data to the backup-track, and then rewriting the read data to the refresh-track for which the reading has been performed, such that the data refresh operation corresponds to N revolutions of the magnetic disk and satisfies relations shown by a following expression:

$$(Bb+Br) \times Td \times L = Bb \times Br \times \{(Td \times N) - 2 \times Ts\}$$

where Bb is the number of blocks included in a backup-track,

Br is the number of blocks included in a track subject to data refreshing,

Td is a time period which a magnetic disk needs to rotate once,

L is the number of blocks of data written in a track subject to data refreshing, N is the number of revolutions of a magnetic disk which corresponds to data refreshing, and "2×Ts" is a seek time which a head needs to move back and forth between a track subject to data refreshing and a backup-track.

4. The controller of claim 3, wherein a rotational delay of the magnetic disk relating to data refreshing is reduced.

5. A method for data refreshing in a magnetic disk drive, the magnetic disk drive comprising a backup-track which is used for backup of data refreshing and a refresh-track of which data is refreshed, the method comprising controlling a data refresh operation of reading L blocks of data written in the refresh-track, writing the read data to the backup-track, and then rewriting the read data to the refresh-track for which the reading has been performed, such that the data refresh operation corresponds to N revolutions of the magnetic disk and satisfies relations shown by a following expression:

$$(Bb+Br) \times Td \times L = Bb \times Br \times \{(Td \times N) - 2 \times Ts\}$$

where Bb is the number of blocks included in a backup-track,

Br is the number of blocks included in a track subject to data refreshing,

Td is a time period which a magnetic disk needs to rotate once,

L is the number of blocks of data written in a track subject to data refreshing, N is the number of revolutions of a magnetic disk which corresponds to data refreshing, and "2×Ts" is a seek time which a head needs to move back and forth between a track subject to data refreshing and a backup-track.

6. The method of claim 5, wherein a rotational delay of the magnetic disk relating to data refreshing is reduced.

* * * * *